No. 703,197. Patented June 24, 1902.
J. A. HEANY.
MANUFACTURE OF INSULATED WIRE.
(Application filed Feb. 23, 1901. Renewed Nov. 21, 1901.)
(No Model.) 3 Sheets—Sheet 2.
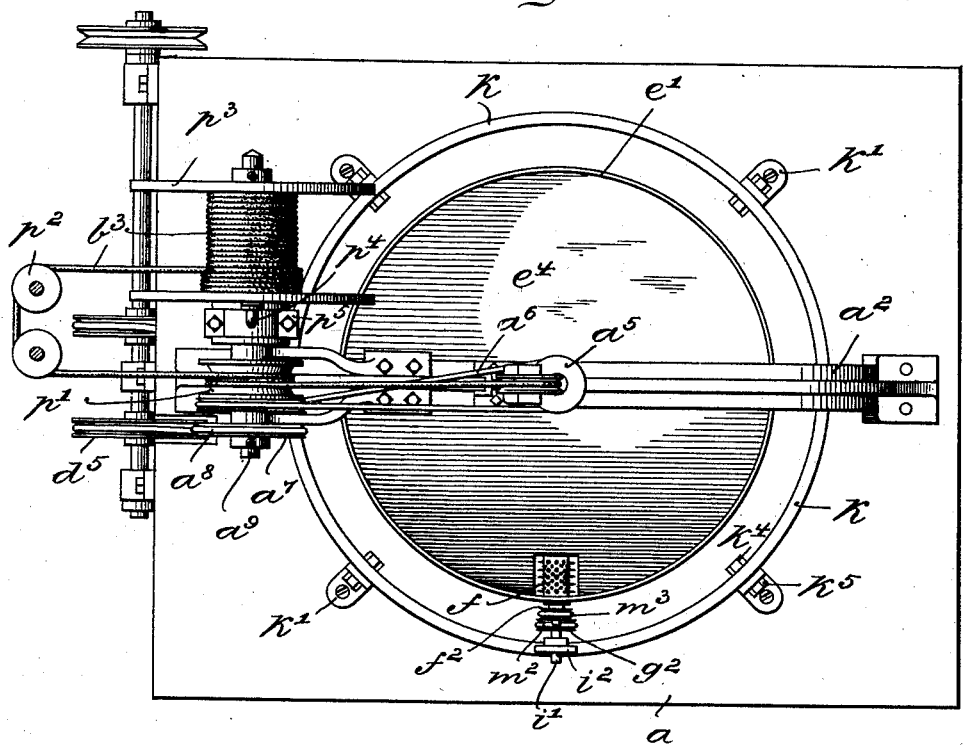
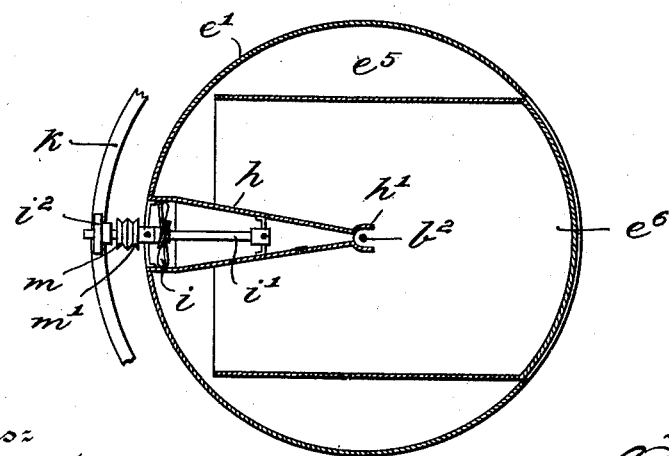

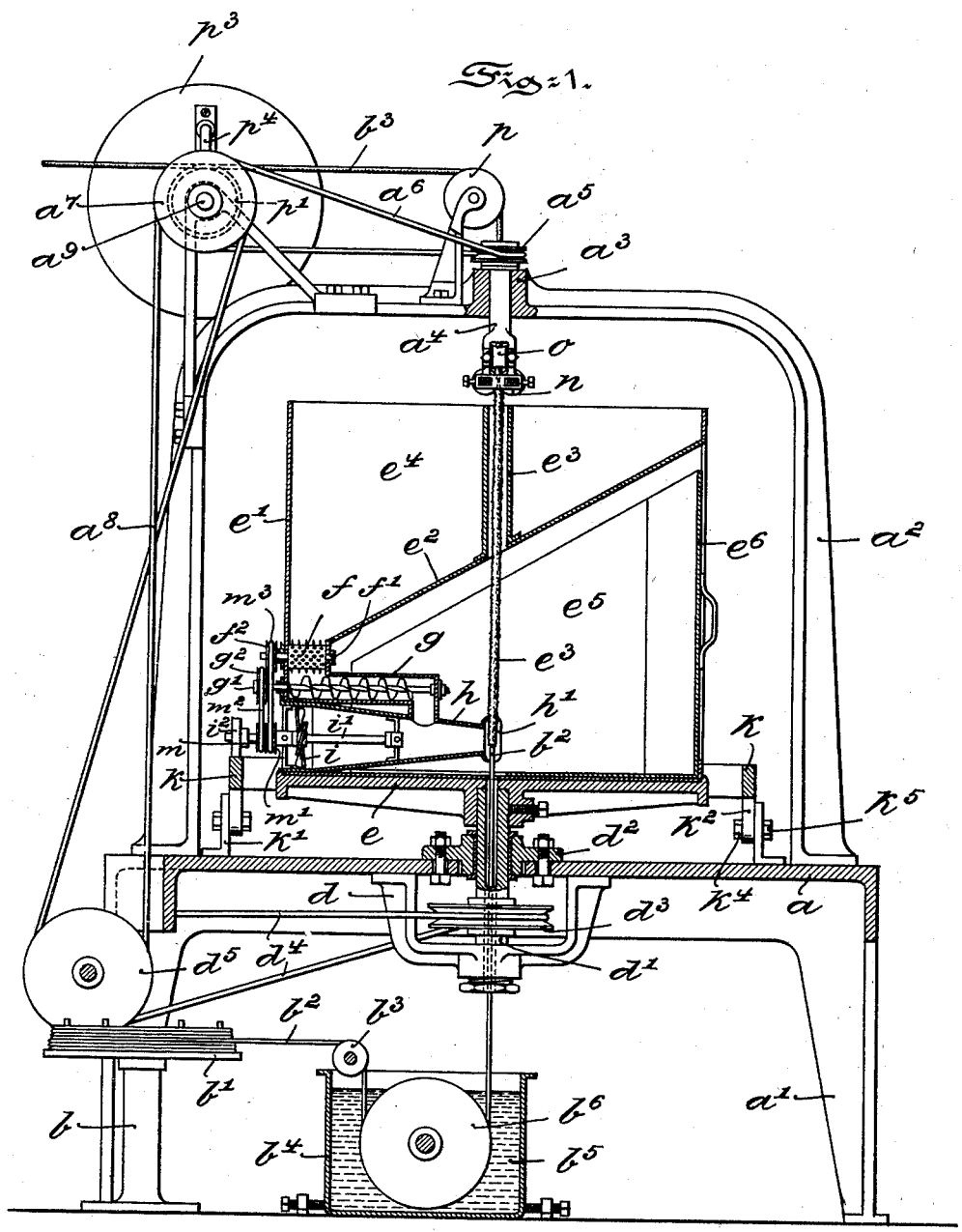

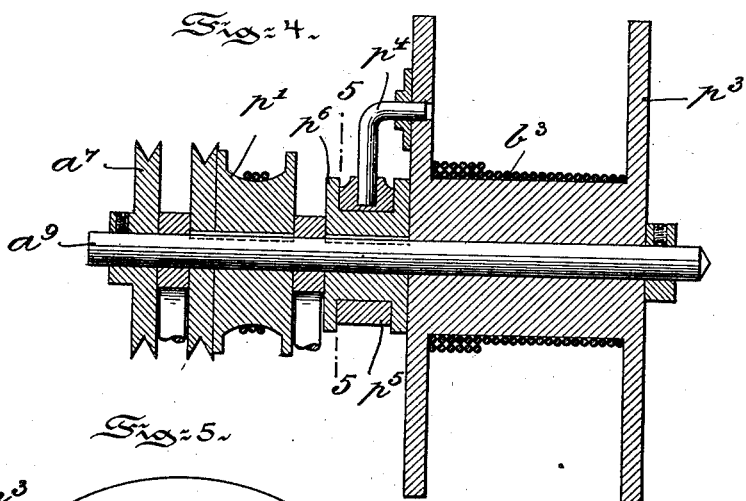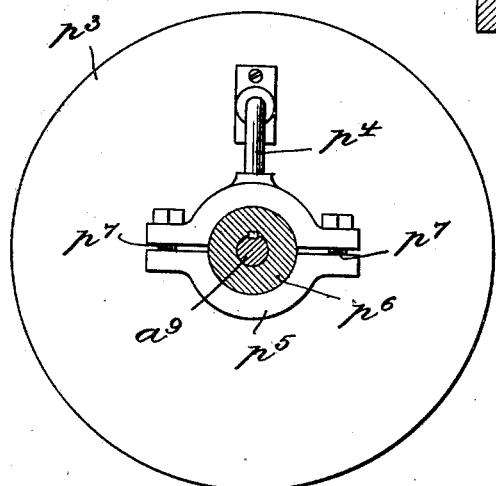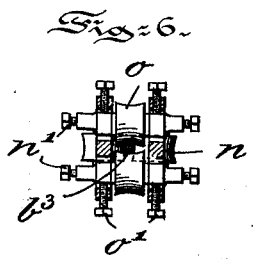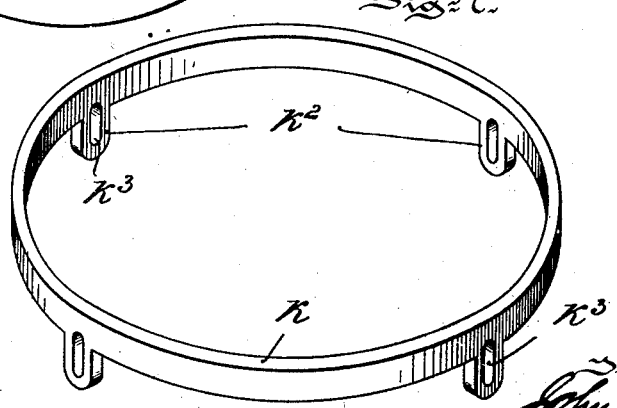

UNITED STATES PATENT OFFICE.

JOHN A. HEANY, OF PHILADELPHIA, PENNSYLVANIA, ASSIGNOR TO THE TETER-HEANY DEVELOPING COMPANY, OF PHILADELPHIA, PENNSYLVANIA, AND CHARLESTON, WEST VIRGINIA, A CORPORATION OF WEST VIRGINIA.

MANUFACTURE OF INSULATED WIRE.

SPECIFICATION forming part of Letters Patent No. 703,197, dated June 24, 1902.

Application filed February 23, 1901. Renewed November 21, 1901. Serial No. 83,173. (No model.)

*To all whom it may concern:*

Be it known that I, JOHN A. HEANY, a citizen of the United States, residing at the city of Philadelphia, in the county of Philadelphia and State of Pennsylvania, have invented certain new and useful Improvements in the Manufacture of Insulated Wire, of which the following is a specification.

My invention has relation to an apparatus for the manufacture of insulated wire, and in such connection it relates to the construction and arrangement of such an apparatus.

The principal object of my invention is to provide an apparatus adapted to cover or coat a metallic wire or electric conductor with a non-combustible material, such as asbestos in flaky form, and to solidly secure said material to the wire under pressure or otherwise, so that the covering or coating will not readily dissipate, crack, or peel off under heat, under torsion of the wire, or otherwise.

The nature and scope of my invention will be more fully understood from the following description, taken in connection with the accompanying drawings, forming part hereof, in which—

Figure 1 is a front elevational view, partly in vertical section, of an apparatus embodying main features of my invention. Fig. 2 is a top or plan view of the apparatus. Fig. 3 is a detail view, in horizontal section, illustrating the fan or blower and the means whereby motion is conveyed to the same. Fig. 4 is an enlarged cross-sectional view of the reel upon which the coated wire is adapted to be wound and of one of the pulleys around which the wire is passed prior to its delivery to the reel. Fig. 5 is a vertical sectional view on the line 5 5 of Fig. 4. Fig. 6 is a detail view, enlarged, of the pressure-rollers for compressing the coating or covering of the wire; and Fig. 7 is a detail view in perspective of the track upon which the fan-operating wheel rotates.

Referring to the drawings, $a$ represents the bed of the machine, supported above the floor upon the legs or supports $a'$. Below the plate $a$ is located a standard $b$, within which rotates a shaft carrying a reel $b'$, upon which the uncoated wire $b^2$ is coiled and from which the wire is to be unwound. From the reel $b'$ the wire passes over a wheel $b^3$ and into a tank $b^4$, containing an adhesive mixture $b^5$. Within the tank $b^4$ is located a guide-wheel $b^6$, under which the wire $b^2$ passes, so as to insure its passage through the bath or mixture $b^5$.

Projecting from the bed $a$ and above the tank $b^4$ is a bracket or bearing $d$, in which is adapted to turn a tubular or hollow shaft $d'$. This shaft $d'$ also traverses the bed $a$ and turns within a suitable block or bearing $d^2$ in said bed. Upon the hollow shaft $d'$ is keyed or otherwise secured a grooved pulley $d^3$, connected by a belt or cord $d^4$ with the main driving-pulley $d^5$ of the machine. To the upper end of the hollow shaft $d'$ is secured the base $e$ of a drum-like receptacle $e'$, which as the shaft $d'$ and base $e$ rotate is adapted to revolve around the hollow of the shaft $d'$ as an axis. The drum $e'$ is divided into two main compartments by an inclined partition $e^2$, which supports centrally of the drum $e'$ a tube $e^3$ to permit of the passage of the wire $b^2$ after it has been coated through the drum. The upper compartment $e^4$ is adapted to contain the non-combustible material, usually asbestos, in flaky form, and it serves as a hopper to feed the material to a third and lesser compartment at one side of the drum $e'$. At the base of the outlet from the compartment $e^4$ into the lesser compartment is arranged a picking or breaking-up wheel $f$, by means of which the flakes of material are torn apart or shredded. Below the picking-wheel $f$ is located a screw conveyer $g$, which conducts the shredded material from the picking-wheel $f$ to the outlet end of a funnel-shaped casing or tube $h$, at the other end of which, near the periphery of the drum $e'$, is arranged a fan or blower $i$. At the outlet end of the funnel-shaped casing $h$ is arranged a tubular extension $h'$, surrounding and partly inclosing the wire $b^2$ as it comes from the bath or mixture $b^5$. The shaft $f'$ of the picker-wheel $f$, the shaft $g'$ of the screw conveyer $g$, and the shaft $i'$ of the fan or blower $i$ are all rapidly rotated by the following preferred arrangements:

Concentric with and inclosing the base $e$ of the drum-like receptacle $e'$ is a circular track $k$, supported by and above the bed $a$ of the machine by suitable brackets $k'$. Upon this track $k$ is adapted to travel as the drum $e'$ revolves a friction-wheel $i^2$, secured to the shaft $i'$ of the fan or blower $i$. As the drum rotates the friction-wheel $i^2$ rapidly revolves and rotates the shaft $i'$ and fan or blower $i$. On the shaft $i$ is also secured two pulleys $m$ and $m'$, one of which, $m$, drives, through a belt $m^2$, a pulley $g^2$ on the shaft $g'$ of the conveyer $g$ to revolve said conveyer, and the other, $m'$, drives, through a belt $m^3$, a pulley $f^2$ on the shaft $f'$ of the picker-wheel $f$ to cause said wheel $f$ to revolve. The track $k$ is adjustably connected to the brackets $k'$ by the following preferred means: Depending from the track $k$ is a series of ears or lugs $k^2$, each slotted, as at $k^3$, to receive a bolt $k^4$. The bolts $k^4$ pass through the brackets $k'$ and through the slots $k^3$ of the ears or lugs $k^2$, and by means of the nuts $k^5$ the ears or lugs $k^2$ may be tightly clamped to said brackets $k'$. By loosening the bolts $k^4$ the track $k$ may be elevated from or depressed toward the bed $a$, so as to permit of the use of one of a number of friction-wheels $i^2$ of varying diameters upon the shaft $i'$ of the fan or blower $i$, and hence the speed of said shaft and blower may be increased or decreased, as required, by the elevation or depression of the track $k$ and the substitution of a wheel $i^2$ of required diameter.

Below the partition $e^2$ is the second main compartment $e^5$, arranged to receive the refuse material blown through the funnel $h$, and for this purpose it is provided with a scoop-like receptacle $e^6$, adapted when full to be removed through an opening in the side of the drum $e'$.

So far as explained the operation of the apparatus is as follows: After the wire $b^2$ has been coated with the adhesive mixture it is drawn upward through the shaft $d'$ and through the tubular extension $h'$ of the funnel $h$. As the drum $e'$ revolves the fibrous and flaky material is blown through the funnel $h$ by the fan or blower $i$ upon the entire periphery of the wire and thoroughly covers the same, the non-combustible material adhering to the adhesive coating and forming a furry loose covering or layer $b^3$. Thus covered the wire $b^3$ is drawn upward through the partition $e^2$ and the tubular extension $e^3$. The wire is now ready for the compressing operation.

Supported upon the bed $a$ and projecting upward therefrom is an inverted-U-shaped standard $a^2$, forming a bearing, as at $a^3$, for a vertically-arranged and hollow revoluble shaft $a^4$. This shaft $a^4$ projects downward in alinement with the tube $e^3$ and carries adjacent to the upper end of the said tube $e^3$ two sets of grooved pressure-rollers, one set, $n$, being arranged below the other set, $o$, and each set consisting of two rollers, the grooved peripheries of which approach each other to form an opening, as illustrated in Fig. 6, through which the coated wire $b^3$ passes. Set or adjusting screws $n'$ and $o'$, respectively, regulate the distance separating the rollers $n$ or $o$ of each set, and the set $o$ is arranged, preferably, in a plane at right angles to the plane of the other set $n$, although the grooves of the rollers of both sets are arranged in a vertical plane. Upon the shaft $a^4$ is secured a driving-pulley $a^5$, connected by a belt $a^6$ with a pulley $a^7$, which is driven by a belt $a^8$, connecting the pulley $a^7$ with the main driving-pulley $d^5$. When, therefore, the machine is in operation, the wire $b^3$ passes upward between the two sets of rollers $n$ and $o$, which turn with their shaft $a^4$ and compact or compress the furry covering of the wire with a spiral action down upon the wire. The wire $b^3$ next passes over a guide-roller $p$ and then is wound around a tension and feed roller $p'$, located upon the shaft $a^9$, to which the pulley $a^7$ is secured. The wire next passes, preferably, around two guide-rollers $p^2$ and is fed to and wound upon a revoluble spool $p^3$.

Referring now to Figs. 2, 4, and 5, the spool $p^3$ is arranged loosely upon the shaft $a^9$ and is connected by a bent arm or pin $p^4$ to a split sleeve or collar $p^5$, adapted to frictionally contact with a grooved collar $p^6$, secured to and traveling with said shaft $a^9$. The split sleeve $p^5$ is bound frictionally to the grooved collar $p^6$ by means of the bolts $p^7$ to such an extent as to permit the spool $p^3$ to travel with the shaft $a^9$ only when the wire $b^3$ is to be wound up at a certain rate of speed. Inasmuch as each succeeding layer or coil of wire $b^3$ on the spool $p^3$ is longer than the preceding coil, and inasmuch as the feeding of the wire to the spool is regulated by the tension and feed roller $p'$, which travels at the uniform speed of the shaft $a^9$, the speed of the spool $p^3$ must be retarded more and more as each succeeding coil is laid on the spool. The connection of the spool $p^3$ to the friction collar or sleeve $p^5$ by means of the bent arm or pin $p^4$ permits the spool $p^3$ to be revolved by the shaft $a^9$ at a gradually-decreasing speed, the differences in speed being taken up by the slipping of the split sleeve $p^5$ on the collar $p^6$.

Having thus described the nature and object of my invention, what I claim as new, and desire to secure by Letters Patent, is—

1. In an apparatus of the character described, a tank containing a liquid adhesive mixture through which the wire is adapted to be drawn to become coated therewith, a receptacle in which the fibrous material, comprising the covering, is adapted to be received, means for feeding said fibrous material from said receptacle, and means for blowing the material so fed upon the coated wire, substantially as and for the purposes described.

2. In an apparatus of the character described, a receptacle adapted to contain a fibrous, flaky insulating material, means for feeding said material from said receptacle, a blower-chamber adapted to receive the material so fed, a blower situated at one end of said chamber and a tubular extension at the other end of said chamber through which the wire is adapted to be fed, substantially as and for the purposes described.

3. In an apparatus of the character described, in combination with means for feeding the wire, and means for coating said wire with an adhesive substance, of means for blowing upon the coated surface of the wire an insulating material in fibrous, flaky form, substantially as and for the purposes described.

4. In an apparatus of the character described, in combination with means for feeding the wire and means for coating said wire with an adhesive substance, of a receptacle adapted to be traversed by the coated wire and containing a fibrous flaky insulating material, a tubular extension partly inclosing said wire, means for conveying the insulating material from said receptacle toward said tubular extension, and means for blowing the material into the tubular extension and onto the wire, substantially as and for the purposes described.

5. In an apparatus of the character described, a drum-like receptacle divided into two main compartments by an inclined partition, one of said compartments arranged to contain the insulating material, a base carrying said receptacle, a hollow revoluble shaft to which the base is centrally secured, said shaft constituting a guide for the wire and the means for rotating the drum, means for feeding the wire axially through the drum, and means controlled by the rotation of the drum for blowing the material in fibrous flaky form upon the wire as said drum revolves around the wire, substantially as and for the purposes described.

6. In an apparatus of the character described, a drum divided into two main compartments by an inclined partition, the upper of said compartments containing the insulating material, and having an outlet at the lowermost end of the partition adjacent to a peripheral wall of the drum, a picker-wheel arranged below said outlet, a conveyer located below the picker-wheel, a chamber into which the conveyer discharges intermediate of the ends, a blower located in the chamber at one end thereof adjacent to the peripheral wall of the drum, a tubular guide at the opposite end of said blower-chamber through which the wire is adapted to be fed, means for revolving said drum and tubular guide about the wire as an axis, and means controlled by the revolution of the drum for actuating the picker-wheel, conveyer and blower, substantially as and for the purposes described.

7. In an apparatus of the character described, a drum divided into two main compartments by an inclined partition, the upper compartment adapted to contain the insulating material, a blower-chamber located below the upper compartment, means for feeding the material from said upper compartment to the blower-chamber intermediate of its ends, said chamber arranged radially with respect to the drum, a blower located at the outer end of said blower-chamber, a tubular guide adapted to receive the wire and located at the axial or outlet end of said blower-chamber, and means controlled by the rotation of the drum for actuating said blower, substantially as and for the purposes described.

8. In an apparatus of the character described, a revoluble receptacle divided into compartments, in one of which the insulating material is adapted to be contained, means for feeding the wire to be covered axially through the revoluble receptacle, and means for feeding and blowing the insulating material toward and upon said wire, said feeding and blowing means revolving with the receptacle, substantially as and for the purposes described.

9. In an apparatus of the character described, in combination with the revoluble drum having a compartment containing the insulating material and traversed axially by the wire to be covered, and means for blowing the material upon the wire, said means traveling with the drum, of a shaft controlling the blowing means, a friction-wheel located upon said shaft, and a track surrounding the drum and upon which the friction-wheel is adapted to travel as the drum revolves, substantially as and for the purposes described.

10. In an apparatus of the character described, in combination with a revoluble drum, having a compartment containing the insulating material and traversed axially by the wire to be covered, and means for blowing the material upon the wire, said means traveling with the drum, of a shaft controlling said means and adapted to receive a friction-wheel, a track surrounding the drum and upon which the friction-wheel is adapted to travel as the drum revolves, and means for elevating or depressing said track toward or away from the shaft, whereby friction-wheels of varying diameters may be interchangeably secured to said shaft to regulate the speed of said shaft, substantially as and for the purposes described.

11. In an apparatus of the character described, in combination with means for coating the wire with an adhesive substance and means for blowing the insulating material in flaky fibrous form upon said coated wire to cause the same to adhere thereto, of means for compressing and compacting said flaky fibrous material on said wire, substantially as and for the purposes described.

12. In an apparatus of the character described, a spool upon which the covered wire is adapted to be wound, a driven shaft upon which the spool is loosely arranged, a collar secured to said shaft, a split sleeve adapted to be clamped frictionally to said collar, and an arm or pin connecting said split sleeve to the side of said spool, substantially as and for the purposes described.

13. In an apparatus of the character described, a spool upon which the covered wire is adapted to be wound, a driven shaft upon which the spool is loosely arranged, a collar secured to said shaft, a split sleeve adapted to be clamped frictionally to said collar, and means for connecting said sleeve to said spool, substantially as and for the purposes described.

14. In an apparatus of the character described, means for coating wire with an adhesive substance, means for blowing upon the coated surface of the wire a non-combustible fibrous material or substance to cause the same to adhere thereto, means for compressing the material or substance applied to said coated and covered wire in the laying up of the same in the machine, substantially as and for the purposes described.

15. In an apparatus of the character described, means for applying an adhesive coating and applying a fibrous material or substance to a wire, and means for compressing the material or substance applied to said coated and covered wire by drawing the wire between a plurality of rollers, at varying angles and said rollers adapted to rotate around the wire in its passage between them, substantially as and for the purposes described.

In testimony whereof I have hereunto set my signature in the presence of two subscribing witnesses.

JOHN A. HEANY.

Witnesses:
J. WALTER DOUGLASS,
THOMAS M. SMITH.